(12) United States Patent
Miranda et al.

(10) Patent No.: US 9,656,922 B2
(45) Date of Patent: May 23, 2017

(54) COAL REFUSE REMEDIATION PROCESS

(71) Applicant: HARSCO CORPORATION, Camp Hill, PA (US)

(72) Inventors: Stephen R. Miranda, Coraopolis, PA (US); William V. Abbate, Gibsonia, PA (US); Mary Provance-Bowley, Valencia, PA (US)

(73) Assignee: HARSCO CORPORATION, Camp Hill, PA (US)

( * ) Notice: Subject to any disclaimer, the term of this patent is extended or adjusted under 35 U.S.C. 154(b) by 0 days.

(21) Appl. No.: 14/782,958

(22) PCT Filed: Apr. 29, 2014

(86) PCT No.: PCT/US2014/035856
§ 371 (c)(1),
(2) Date: Oct. 7, 2015

(87) PCT Pub. No.: WO2014/179299
PCT Pub. Date: Nov. 6, 2014

(65) Prior Publication Data
US 2016/0304408 A1    Oct. 20, 2016

Related U.S. Application Data

(60) Provisional application No. 61/817,395, filed on Apr. 30, 2013.

(51) Int. Cl.
*C05D 9/02* (2006.01)
*B09B 3/00* (2006.01)
(Continued)

(52) U.S. Cl.
CPC .................. *C05D 9/02* (2013.01); *B09B 3/00* (2013.01); *B09C 1/105* (2013.01); *C05D 9/00* (2013.01);
(Continued)

(58) Field of Classification Search
CPC .... C05D 9/02; C05D 9/00; B09B 3/00; B09C 1/105; C05F 11/02; C05G 3/00; C05G 3/04
See application file for complete search history.

(56) References Cited

U.S. PATENT DOCUMENTS 4,015,997 A    4/1977   Selmeczi et al.
4,208,217 A    6/1980   Anderson et al.

FOREIGN PATENT DOCUMENTS

| CN | 1316405 A | 10/2001 |
| WO | 2009031101 A2 | 3/2009 |
| WO | 2013039311 A2 | 3/2013 |

OTHER PUBLICATIONS

Hamilton, James, Jim Gue, and Cheryl Socotch. "The use of steel slag in passive treatment design for AMD discharge in the Huff Run watershed restoration." Proc. Amer. Soc. of Mining and Reclamation, Gillette, WY(2007): 272-282.*

(Continued)

*Primary Examiner* — Jennifer A Smith
(74) *Attorney, Agent, or Firm* — McNees Wallace & Nurick LLC

(57) ABSTRACT

A coal refuse remediation process is described. The process includes providing coal refuse and blending a slag with at least a portion of the coal refuse to form a medium. The coal refuse has a particle size. The medium has a pH within a range of about 3.5 and about 10 and the medium facilitates growth of vegetation when applied to a coal refuse pile at a thickness of less than about 24 inches.

19 Claims, 9 Drawing Sheets

(51) Int. Cl.
*C05D 9/00* (2006.01)
*C05F 11/02* (2006.01)
*C05G 3/00* (2006.01)
*B09C 1/10* (2006.01)
*C05G 3/04* (2006.01)

(52) U.S. Cl.
CPC ............... *C05F 11/02* (2013.01); *C05G 3/00* (2013.01); *C05G 3/04* (2013.01)

(56) References Cited

OTHER PUBLICATIONS

Chesner, Warren H., Robert J. Collins, and M. H. MacKay. User guidelines for waste and by-product materials in pavement construction. No. FHWA-RD-97-148. 1998.*
Larimer, Guidelines for Revegetation of Disturbed Areas (2011).*
Slag Soil Remediation. Text by John Buck, Civil and Environmental Consultant. (2011).*
International Search Report; Int'l App. No. PCT/US2014/035856, filed Apr. 29, 2014.
Zuo Peng-fei, Comprehensive Utilization of Coal Gangue, Jan. 2009, p. 186-188, vol. 28, No. 1, Institute of Coal Science and Technology.
Notification of First Office Action, Issue Date: Aug. 17, 2016, Issue Serial No. 2016081201472210, Title of Invention: A Coal Refuse Horticultural Blend.

* cited by examiner

COAL REFUSE REMEDIATION PROCESS

PRIORITY

The present application claims priority and benefit of U.S. Provisional Patent Application No. 61/817,395, titled "COAL REFUSE REMEDIATION PROCESS", filed Apr. 30, 2013, the entirety of which is incorporated by reference.

FIELD OF THE INVENTION

The present invention is directed to environmental remediation processes. More specifically, the present invention is directed to processes for coal refuse remediation.

BACKGROUND OF THE INVENTION

Refuse from coal mining operations can create environmental hazards when piles excrete highly acidified water from iron and sulfur reactions with precipitation water and/or groundwater. Such issues are especially notable for underground mining operations. A currently accepted method of protecting ground water from such acid drainage involves treating the piles with calcitic liming materials and/or partially or completely encasing the piles with liners. These liners are costly and do not provide a permanent barrier. After a period of time, the liners can degrade, which results in the acid drainage entering the ground and/or water sources. Additionally, the piles can suffer from drawbacks of being unsightly, being devoid of vegetation, being unstable, being unsafe, being prone to erosion, being incapable of growing vegetation, requiring drainage ponds or other expensive mechanisms for managing runoff, or a combination thereof.

A coal refuse remediation process that shows improvements in comparison to the prior art would be desirable.

BRIEF DESCRIPTION OF THE INVENTION

In an exemplary embodiment, a coal refuse remediation process includes providing coal refuse and blending a slag with at least a portion of the coal refuse to form a medium. The coal refuse has a particle size. The medium has a pH within a range of about 3.5 and about 10 and the medium facilitates growth of vegetation when applied to a coal refuse pile at a thickness of less than about 24 inches.

In another exemplary embodiment, a coal refuse remediation process includes providing coal refuse having a particle size, having a pH of less than about 3.5, and having a composition of, by weight, between about 4% and about 8% $Fe_2O_3$, between about 14% and about 18% $Al_2O_3$, at least about 0.01% MnO, between about 2% and about 5% S, and between about 25% and about 35% C, and blending a slag with at least a portion of the coal refuse to form a medium, the slag being from production of a product selected from the group consisting of stainless steel, carbon steel, aluminum, phosphate, copper, zinc, non-ferrous material, alloy steel, iron, coal-powered energy, and combinations thereof. The medium has a pH within a range of about 3.5 and about 10 and the medium facilitates growth of vegetation when applied to a coal refuse pile at a thickness of less than about 24 inches.

In another exemplary embodiment, a coal refuse remediation process includes providing coal refuse having a particle size, having a pH of less than about 3.5, and having a composition of, by weight, between about 4% and about 8% $Fe_2O_3$, between about 14% and about 18% $Al_2O_3$, at least about 0.01% MnO, between about 2% and about 5% S, and between about 25% and about 35% C, and blending a slag from production of one or both of stainless steel and iron to form a medium. The medium has a pH within a range of about 3.5 and about 10 and the medium facilitates growth of vegetation when applied to a coal refuse pile at a thickness of less than about 24 inches.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary coal refuse remediation process and horticultural blend. Embodiments of the present disclosure reduce or eliminate runoff from acid mine drainage, neutralize pH of existing coal refuse piles, neutralize metals within existing coal refuse piles, reduce or eliminate the necessity of water drainage ponds or mechanisms for managing acid mine drainage, reduce or eliminate the formation of sulfuric acid due to drainage from coal refuse, reduce or eliminate runoff of metals from coal refuse (for example, aluminum, manganese, iron, sulfur, pyrite, arsenic, selenium, magnesium, or a combination thereof), reduce or eliminate use of liners (for example, polypropylene and/or polyethylene liners), permit growth of vegetation, permit remediation of large areas (for example, up to and exceeding 120 acres), or a combination thereof.

Figure 1:
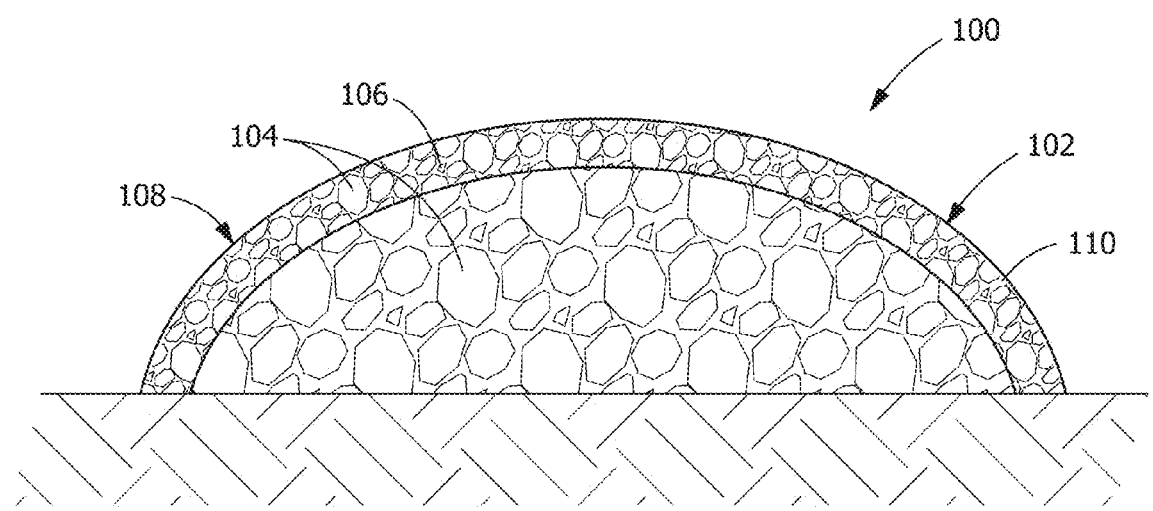
FIG. 1 is a schematic section view of a pile including a blend as a medium, according to a process of coal refuse remediation, according to the disclosure.

FIG. 1 shows a medium 102, formed by a portion or all of a blend 108, according to the disclosure. The blend 108 includes coal refuse 104 blended with slag 106. The coal refuse 104 and the slag 106 are blended by any suitable mixing processes, for example, shear mixing. The coal refuse 104 and the slag 106 are blended in solid form, in solution, as a colloidal suspension, or in any other suitable manner. The coal refuse 104 and the slag 106 are blended in the presence of materials 110, such as, processing additives capable of aiding in mixing and/or in the presence of materials capable of providing additional properties to the medium 102 (for example, soil, soil conditioners, co-products, fertilizer, starter fertilizer, organic matter, bio-solids of human origin, bio-solids of non-human animal origin, plant-derived compost, seeds, or a combination thereof). Additionally or alternatively, the materials 110 are added before or after the blending of the coal refuse 104 and the slag 106.

In one embodiment, the medium 102 is applied to a pile 100, for example, on top of the pile 100, as is shown in FIG. 1. Directional terms used herein correspond with the term down being in the direction of or substantially in the direction of gravity. In further embodiments, the medium 102 is applied below the pile 100, on at least two separate planes (for example, sides) of the pile, on portions or the entirety of the pile 100, or a combination thereof. The medium 102 includes all of the coal refuse 104 in the pile 100, the blend 108 includes a portion of the coal refuse 104 in the pile 100 (for example, at a depth of the pile 100, such as, about 3 inches of the pile 100, about 6 inches of the pile 100, less than or at about 9 inches of the pile 100, less than or at about 12 inches of the pile 100, less than or at about 18 inches of the pile 100, less than or at about 24 inches of the pile 100, between about 3 inches and about 12 inches, between about 6 inches and about 12 inches, between about 9 inches and about 12 inches, between about 12 inches and about 24 inches, between about 12 inches and about 18 inches, between about 18 inches and about 24 inches, or any suitable combination, sub-combination, range, or sub-range therein), or the coal refuse 104 is from a source other than the pile 100.

The pile 100 is composed primarily of the coal refuse 104, whether the coal refuse 104 from the pile 100 forms a part of the medium 102 or not. In one embodiment, the pile 100 is from an underground mining operation and/or includes garbage of bituminous ("GOB"). The pile 100 includes any other refuse materials, such as, bituminous coal, co-products of bituminous coal processing/mining, anthracite coal, co-products of anthracite coal processing/mining, lignite coal, co-products of lignite coal processing/mining, sub-bituminous coal, co-products of sub-bituminous coal processing/mining, steam coal, co-products of steam coal processing/mining, or a combination thereof.

In one embodiment, the pile 100 is graded for development, such as, erecting a building or other structure. To facilitate development, the pile 100 and/or the medium 102 are compacted to a compaction value, for example, above about 90% compaction, above about 92% compaction, above about 95% compaction, above about 97% compaction, above about 99% compaction, to about 100% compaction, between about 90% and about 95% compaction, between about 92% and about 95% compaction, between about 95% and about 100% compaction, between about 97% and about 100% compaction, between about 99% and about 100% compaction, or any suitable combination, sub-combination, range, or sub-range therein. Compaction is determined by any suitable technique or standard, such as, but not limited to, ASTM D698 (Standard Test Methods for Laboratory Compaction Characteristics of Soil Using Standard Effort) and/or ASTM D1557 (Standard Test Methods for Laboratory Compaction Characteristics of Soil Using Modified Effort).

In one embodiment, the pile 100 is used to grow vegetation within the medium 102. Suitable vegetation includes, but is not limited to, trees, grass, flowers, crops, shrubs, ground cover, deciduous plants, coniferous plants, crown vetch, or a combination thereof. The medium 102 is maintained at any suitable thickness for such growth and/or is increased or decreased in thickness based upon the selected vegetation to be grown.

Figure 3:
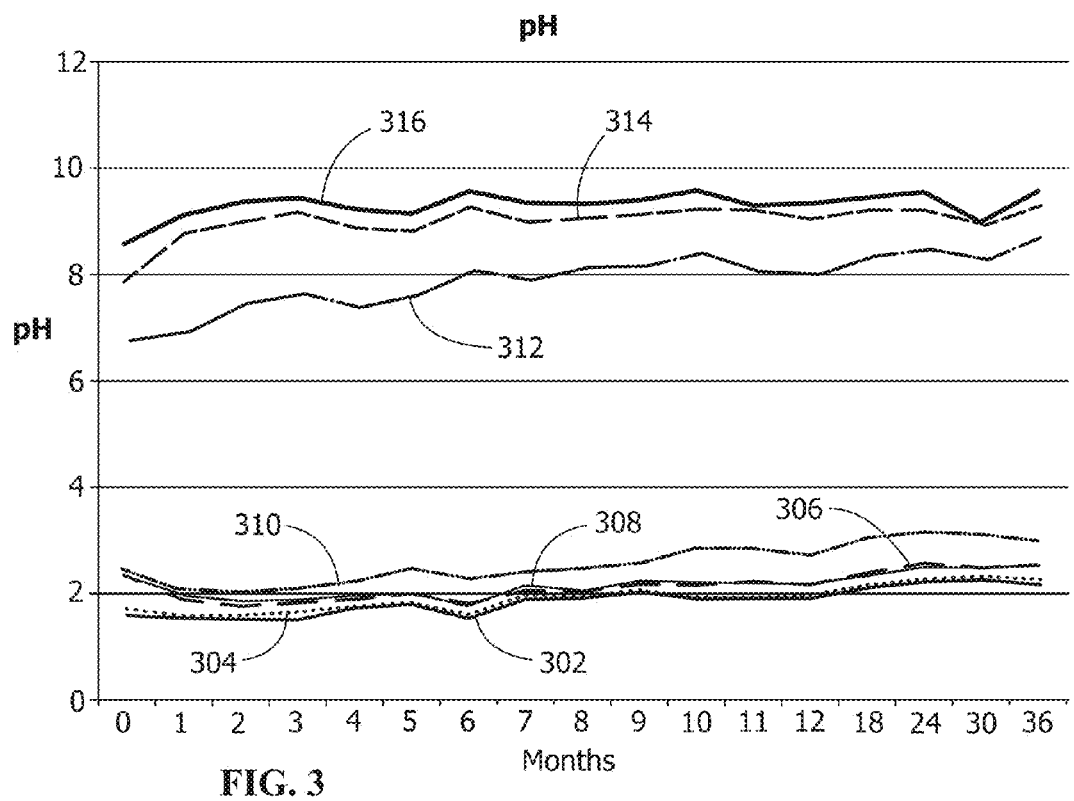
FIG. 3 is a graph illustrating pH of mediums including coal refuse, comparing a control, comparative examples, and embodiments falling within the disclosure.
Figure 15:
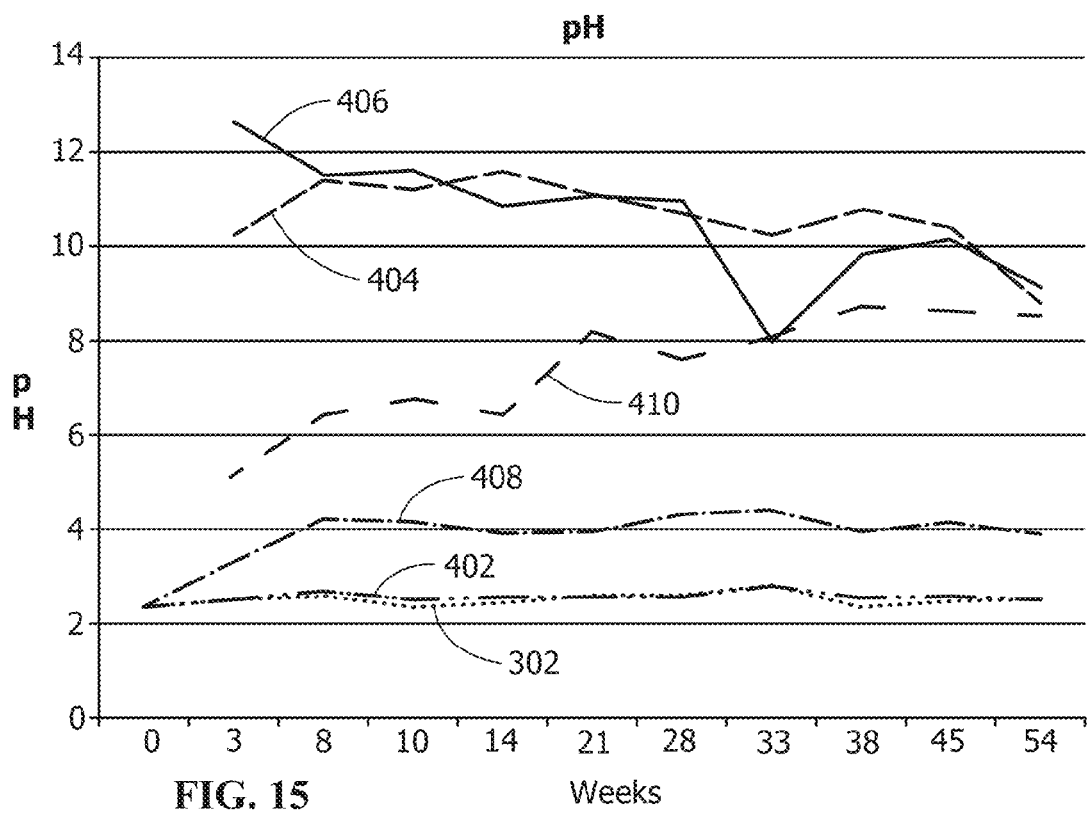
FIG. 15 is a graph illustrating pH of mediums including coal refuse, according to embodiments falling within the disclosure.

The medium 102 facilitates growth of vegetation and/or remediates properties of the coal refuse 104. For example, the medium 102 has a higher pH than the coal refuse 104 and/or increases the pH of the coal refuse 104, for example, from less than about 3.5, from about 3, from about 2.5, from about 2, or any suitable combination, sub-combination, range, or sub-range therein. As shown in FIG. 3, according to embodiments of the disclosure, applying the slag 106 to the coal refuse 104 increases the pH of the medium 102. The pH of the medium 102 is capable of being adjusted to be between about 3.5 and about 10. In further embodiments, the pH begins between about 5.8 and about 6.8, is between about 4 and about 7, is between about 6.8 and about 8.5 over a period of 36 months, is between about 7.9 and about 9.2 over a 36-month period, is between about 8.6 and about 9.5 over a 36-month period, is between about 5 and about 8.2 over a 54-week period, is between about 8.8 and about 11.8 over a 54-week period, is between about 8 and about 13 over a 54-week period, or any suitable combination, sub-combination, range, or sub-range therein. Additionally or alternatively, the pH corresponds with a first embodiment 312 (see FIG. 3), a second embodiment 314 (see FIG. 3), a third embodiment 316 (see FIG. 3), a fourth embodiment 404 (see FIG. 15), a fifth embodiment 406 (see FIG. 15), a sixth embodiment 410 (see FIG. 15), or a combination thereof.

Upon blending the slag 106 throughout the medium 102, the increase in pH corresponds to the concentration of the slag 106. For example, suitable concentrations include, but are not limited to, by weight, between about 1% and about 12%, between about 4% and about 12%, between about 4% and about 8%, between about 1% and about 4%, between about 8% and about 12%, about 4%, about 6.6%, about 7.9%, about 8%, about 10%, about 12%, or any suitable combination, sub-combination, range, or sub-range therein.

The coal refuse 104 has a coarseness and/or maximum particle size. Particles within the coal refuse 104 are identified as being below a predetermined coarseness and/or are ground to be below the predetermined coarseness. In one embodiment, all or substantially all particles within the coal refuse 104 have a maximum dimension of less than about 2 inches. In one embodiment, a portion, all, or substantially all particles within the coal refuse 104 are capable of passing through a selected sieve. For example, in one embodiment, between about 20% and about 50% or at least about 25% of the particles in the coal refuse 104 are capable of passing through a standard number 4 sieve. In one embodiment, between about 40% and about 50% or about 40% of the particles in the coal refuse 104 are capable of passing through a standard number 4 sieve.

The coal refuse 104 has a composition based upon the source. In one embodiment, the coal refuse 104 includes, by weight, about 10% to about 15% being refuse materials, about 10% to about 20% being refuse materials, about 15% to about 20% being refuse materials, or any suitable combination, sub-combination, range, or sub-range therein. The refuse materials include materials, such as, but not limited to, co-products of bituminous coal processing/mining, co-products of anthracite coal processing/mining, co-products of lignite coal processing/mining, co-products of sub-bituminous coal processing/mining, co-products of steam coal processing/mining, or a combination thereof. In one embodiment, the coal refuse 104 has a composition, by weight, of about 85% to about 90% coal, about 80% to about 90% coal, about 80% to about 85% coal, or any suitable combination, sub-combination, range, or sub-range therein. The coal includes materials, such as, but not limited to, bituminous coal, anthracite coal, lignite coal, sub-bituminous coal, steam coal, or a combination thereof.

The coal refuse 104 includes a composition based upon the refuse material(s) and the coal within the coal refuse 104. In one embodiment, the coal refuse 104 includes $Fe_2O_3$, $Al_2O_3$, MnO, S, and C.

In one embodiment, the coal refuse 104 includes the $Fe_2O_3$ at a concentration, by weight, of between about 4% and about 8%, between about 5% and about 7%, between about 5% and about 6%, between about 5% and about 8%, between about 4% and about 7%, at about 5%, at about 6%, at 5.73%, or any suitable combination, sub-combination, range, or sub-range therein.

In one embodiment, the coal refuse 104 includes the $Al_2O_3$ at a concentration, by weight, of between about 14% and about 18%, between about 14% and about 17%, between about 15% and about 18%, between about 16% and about 18%, between about 16% and about 17%, at about 16.54%, or any suitable combination, sub-combination, range, or sub-range therein.

In one embodiment, the coal refuse 104 includes the MnO at a concentration, by weight, of at least about 0.01%, at least about 0.02%, about 0.01%, about 0.02%, between about 0.01% and about 0.02%, or any suitable combination, sub-combination, range, or sub-range therein.

In one embodiment, the coal refuse 104 includes the S at a concentration, by weight, of between 2% and about 5%, between about 3% and about 5%, between about 2% and about 4%, at about 2%, at about 3%, at about 4%, at about 5%, or any suitable combination, sub-combination, range, or sub-range therein.

In one embodiment, the coal refuse 104 includes the C at a concentration, by weight, of between about 25% and about 35%, between about 25% and about 30%, between about 27% and about 30%, between about 28% and about 29%, at about 28%, at about 29%, at about 28.58%, or any suitable combination, sub-combination, range, or sub-range therein.

All or a portion of the slag 106 is a portion of the pile 100 or is not from the pile 100. The slag 106 is any suitable size and/or material capable of blending with the coal refuse 104. In one embodiment, the slag 106 includes a maximum particle dimension of no more than about 1 inch, no more than about 0.5 inches, no more than about 0.3 inches, between about 0.3 inches and about 1 inch, between about 0.3 and about 0.5 inches, or any suitable combination, sub-combination, range, or sub-range therein.

The material of the slag 106 corresponds to the sources of the slag 106, for example, a powder, a granule, and/or an agglomerated solid formed by a mining, consumption, or production process. Production of slag forms multiple types of the slag 106, such as, a silicon-containing by-product and/or a filler-type of by-product, capable of use as road material, roofing, cementitious material, engineered fill, acid mine drainage (AMD) remediation, sludge stabilization, and combinations thereof.

In one embodiment, the slag 106 is formed during production of a product, such as, but not limited to, stainless steel, carbon steel, aluminum, phosphate, copper, zinc, non-ferrous material, alloy steel, iron, combustion products and energy (such as from coal), or any other suitable product.

In one embodiment, the slag 106 corresponds with the slag being a metal slag, such as, carbon steel slag, aluminum slag, copper slag, zinc slag, non-ferrous slag, argon oxygen decarburization slag (AOD slag), alloy steel slag, stainless steel slag, blast furnace slag (for example, from the production of iron), blast oxygen furnace slag (BOFS), or combinations thereof. In one embodiment, the slag is a non-metal slag, such as, phosphate slag or coal slag.

Figure 2:
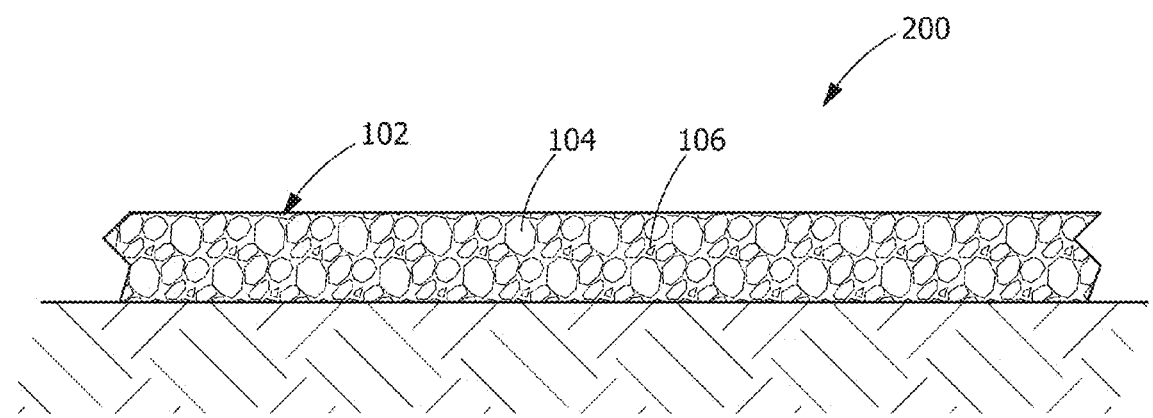
FIG. 2 is a schematic section view of a horticultural blend as a medium, according to the disclosure.

FIG. 2 shows an embodiment of the medium 102, where the medium 102 is a horticultural blend 200. The horticultural blend 200 is capable of being applied to any suitable surface, whether on the pile 100 shown in FIG. 1 or on any other surface where growth of vegetation is desired. The horticultural blend 200 includes the coal refuse 104 (whether or not the coal refuse 104 is from the pile 100 shown in FIG. 1) and the slag 106. The horticultural blend 200 is formed on-site, proximal to a source (not shown) of the coal refuse 104, and/or at a processing facility (not shown) configured for blending the coal refuse 104 with the slag 106.

The medium 102 and/or the horticultural blend 200 include other properties for specific uses or applications. For example, such properties include, but are not limited to, electrical conductivity being within a specific range, total dissolved solids (TDS) being within a specific range, redox potential being within a specific range, Fe content being within a specific range, Al content being within a specific range, Mn content being within a specific range, sulfate content being within a specific range, and/or chloride content being within a specific range.

Figure 4:
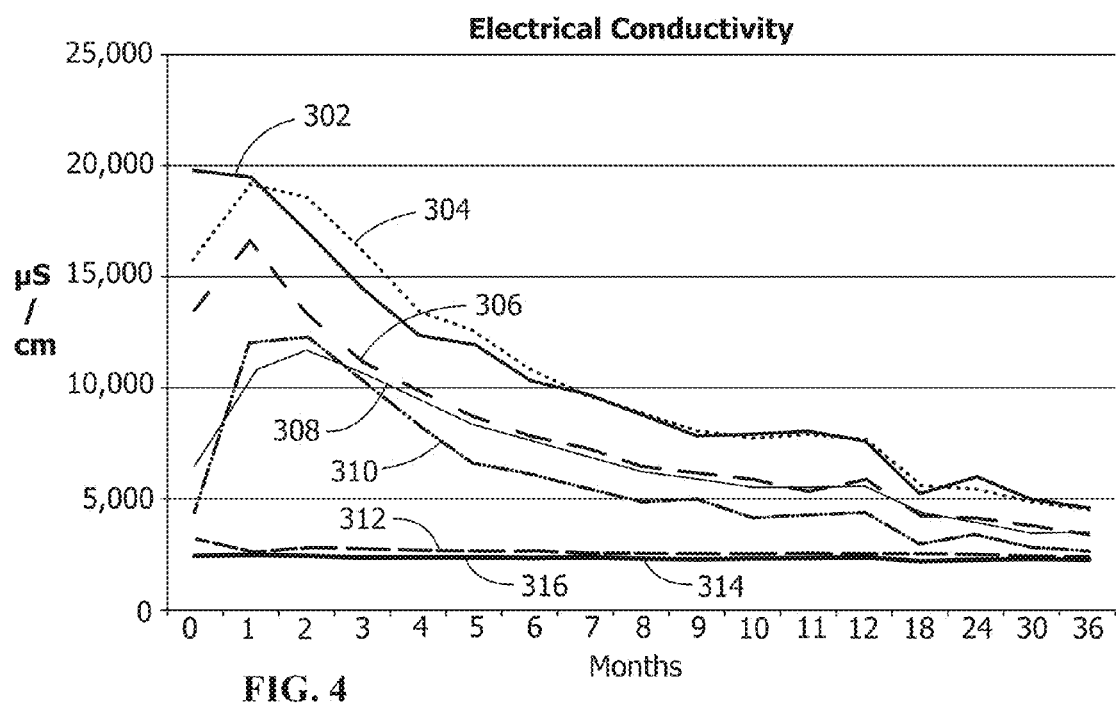
FIG. 4 is a graph illustrating electrical conductivity of mediums including coal refuse, comparing a control, comparative examples, and embodiments falling within the disclosure.

Suitable electrical conductivity values include, but are not limited to, between about 2,500 and about 3,000 microsiemens per centimeter, between about 2,000 and about 4,000 microsiemens per centimeter, between about 2,000 and about 2,500 microsiemens per centimeter, between about 3,000 and about 4,000 microsiemens per centimeter, or any suitable combination, sub-combination, range, or sub-range therein. In one embodiment, electrical conductivity begins at between about 2,800 microsiemens per centimeter and 3,200 microsiemens per centimeter, for example, about 3,000 microsiemens per centimeter, and slightly decreases to between about 2,300 microsiemens per centimeter and about 2,700 microsiemens per centimeter, for example, about 2,500 microsiemens per centimeter, over a period of 36 months (see FIG. 4). In another embodiment, the electrical conductivity begins at between about 2,400 microsiemens per centimeter and about 2,600 microsiemens per centimeter, for example, about 2,500 microsiemens per centimeter, and stays between about 2,400 microsiemens per centimeter and about 2,600 microsiemens per centimeter, for example, at about 2,500 microsiemens per centimeter, over a period of 36 months (see FIG. 4). Additionally or alternatively, the electrical conductivity value corresponds with a first embodiment 312 (see FIG. 4), a second embodiment 314 (see FIG. 4), a third embodiment 316 (see FIG. 4), or a combination thereof.

Figure 5:
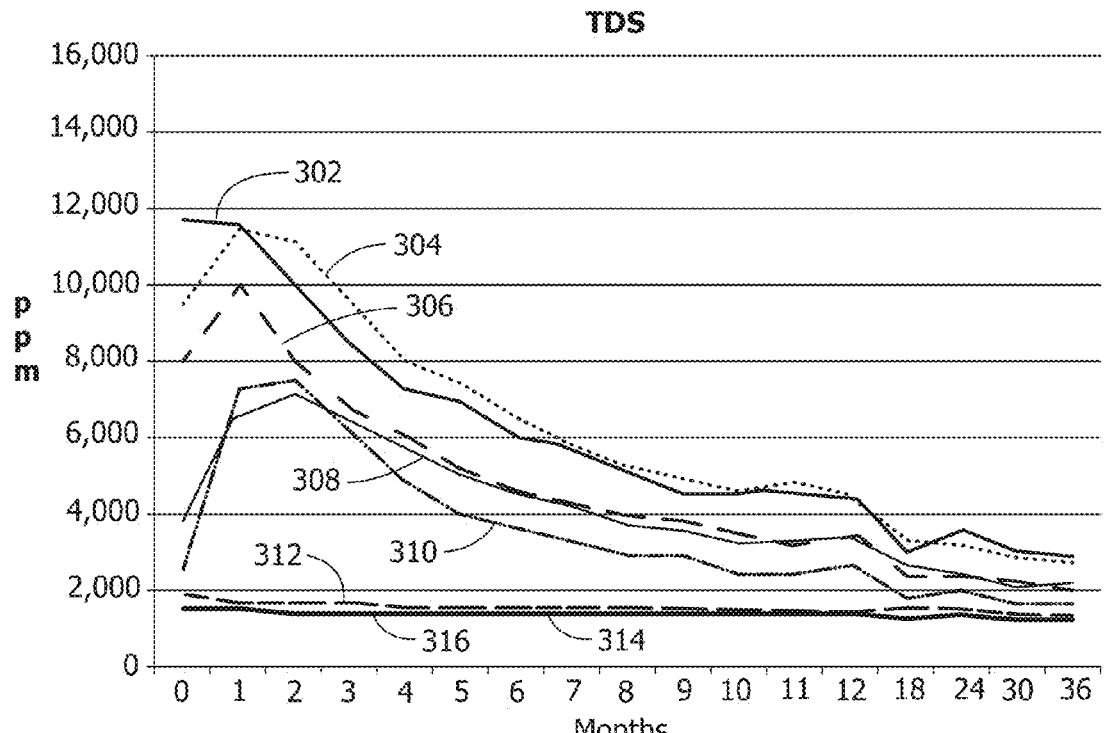
FIG. 5 is a graph illustrating total dissolved solids of mediums including coal refuse, comparing a control, comparative examples, and embodiments falling within the disclosure.

Suitable TDS values include, but are not limited to, between about 1,200 parts per million (ppm) and about 2,000 ppm, between about 1,200 ppm and about 1,600 ppm, between about 1,600 ppm and about 2,000 ppm, or any suitable combination, sub-combination, range, or sub-range therein. In one embodiment, the TDS begins between about 1,800 ppm and about 2,200 ppm, for example, at just below about 2,000 ppm and slightly decreases to between about 1,000 ppm and about 1,400 ppm, for example, at about 1,200 ppm over a period of 36 months (see FIG. 5). In another embodiment, the TDS begins between about 1,400 ppm and about 1,800 ppm, for example, at just below about 1,600 ppm and slightly decreases to between about 1,000 ppm and about 1,400 ppm, for example, about 1,200 ppm over a period of 36 months (see FIG. 5). Additionally or alternatively, the TDS corresponds with a first embodiment 312 (see FIG. 5), a second embodiment 314 (see FIG. 5), a third embodiment 316 (see FIG. 5), or a combination thereof.

Figure 6:
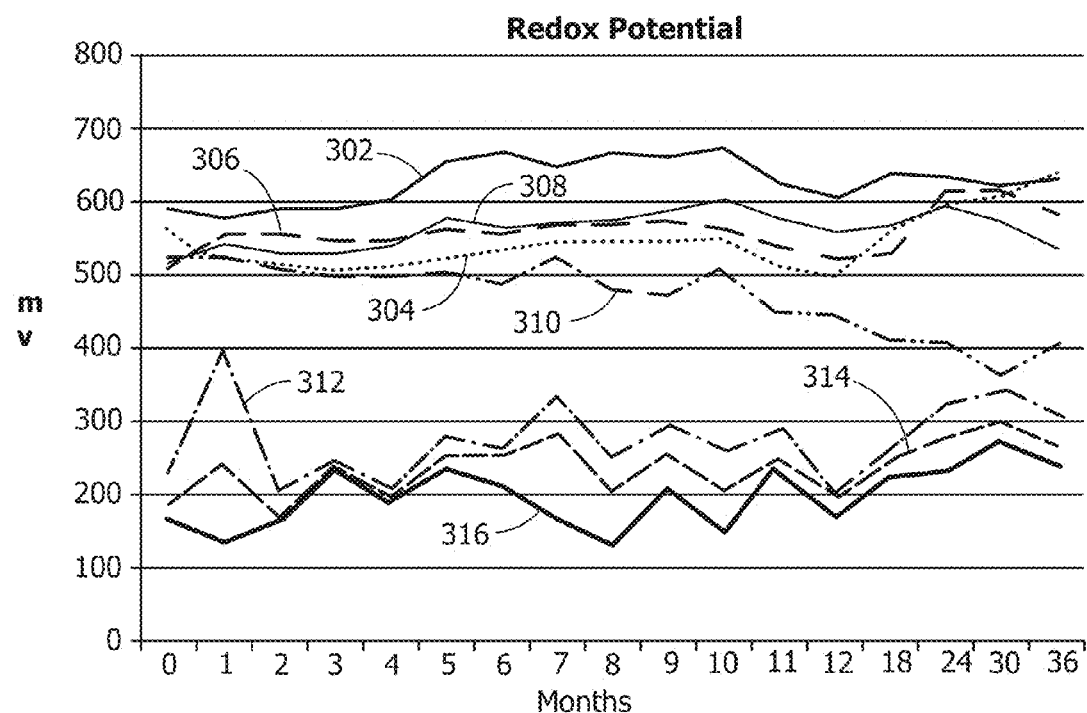
FIG. 6 is a graph illustrating redox potential of mediums including coal refuse, comparing a control, comparative examples, and embodiments falling within the disclosure.

Suitable redox potential values include, but are not limited to, between about 180 mv and about 400 mv, between about 190 mv and about 400 mv, between about 200 mv and about 400 mv, between about 230 mv and about 400 mv, between about 240 mv and about 400 mv, between about 280 mv and about 400 mv, or any suitable combination, sub-combination, range, or sub-range therein. In one embodiment, the redox potential begins between about 220 mv and about 240 mv, for example, at about 230 mv and varies between about 200 mv and about 400 mv over a period of 36 months (see FIG. 6). In another embodiment, the redox potential begins between about 180 mv and about 200 mv, for example, at about 190 mv, and generally increases to between about 270 mv and about 290 mv, for example, about 280 mv over a period of 36 months (see FIG. 6). In another embodiment, the redox potential begins between about 170 mv and about 190 mv, for example, at about 180 mv, and generally increases to between about 230 mv and about 250 mv, for example, about 240 mv over a period of 36 months (see FIG. 6).

Figure 7:
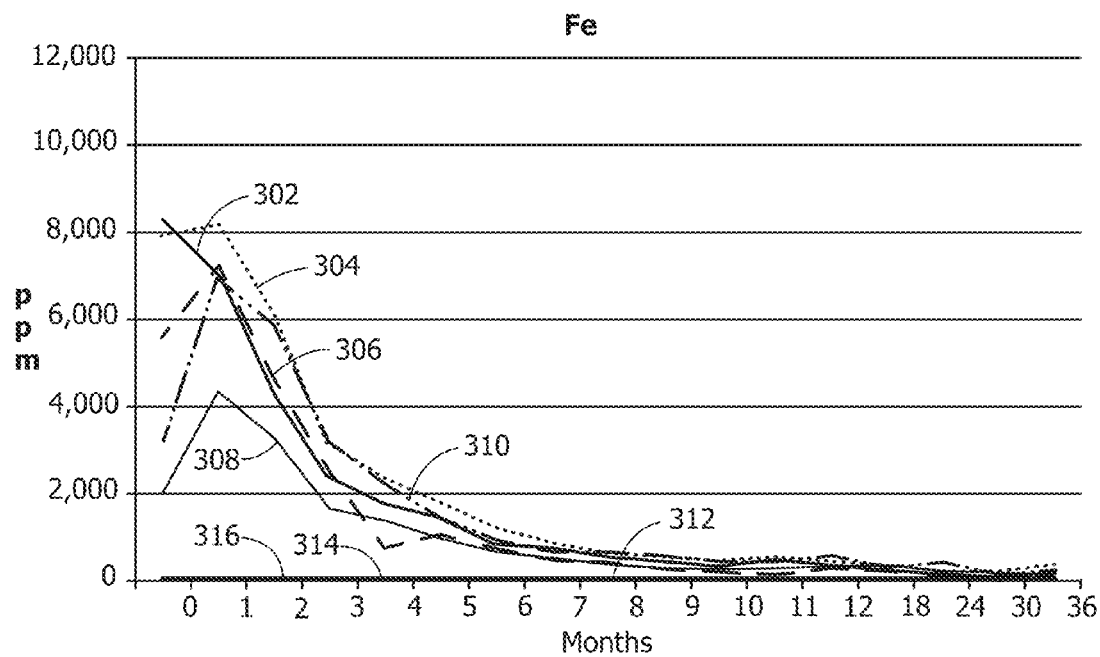
FIGS. 7-8 are graphs illustrating Fe content of mediums including coal refuse, comparing a control, comparative examples, and embodiments falling within the disclosure.
Figure 8:
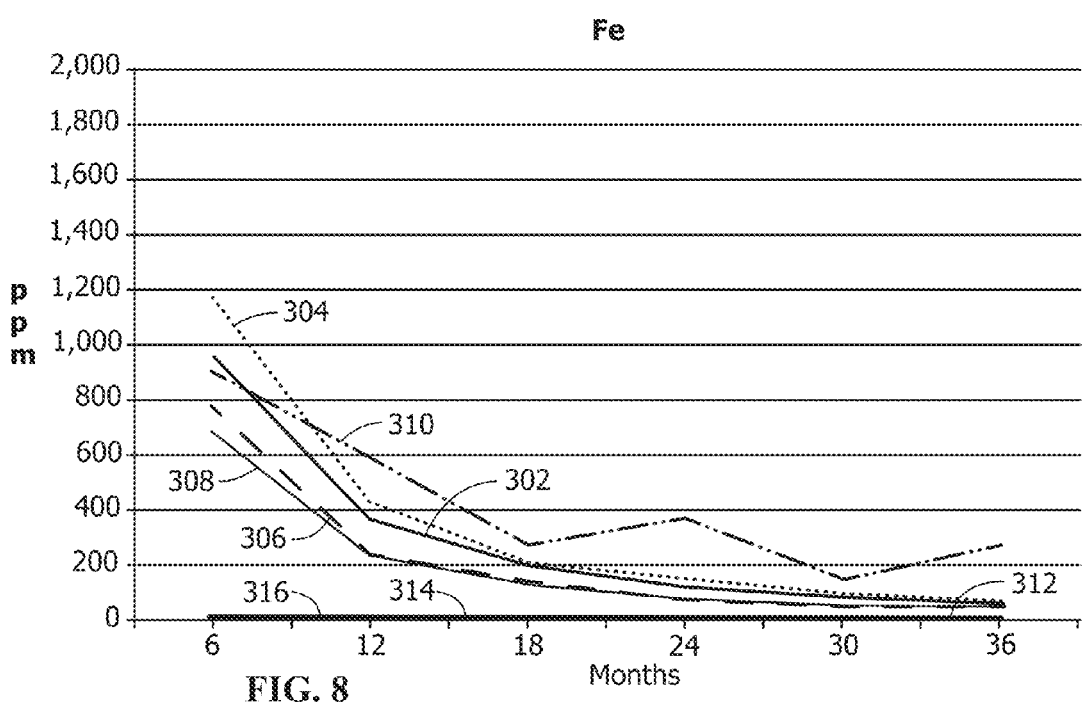
Figure 16:
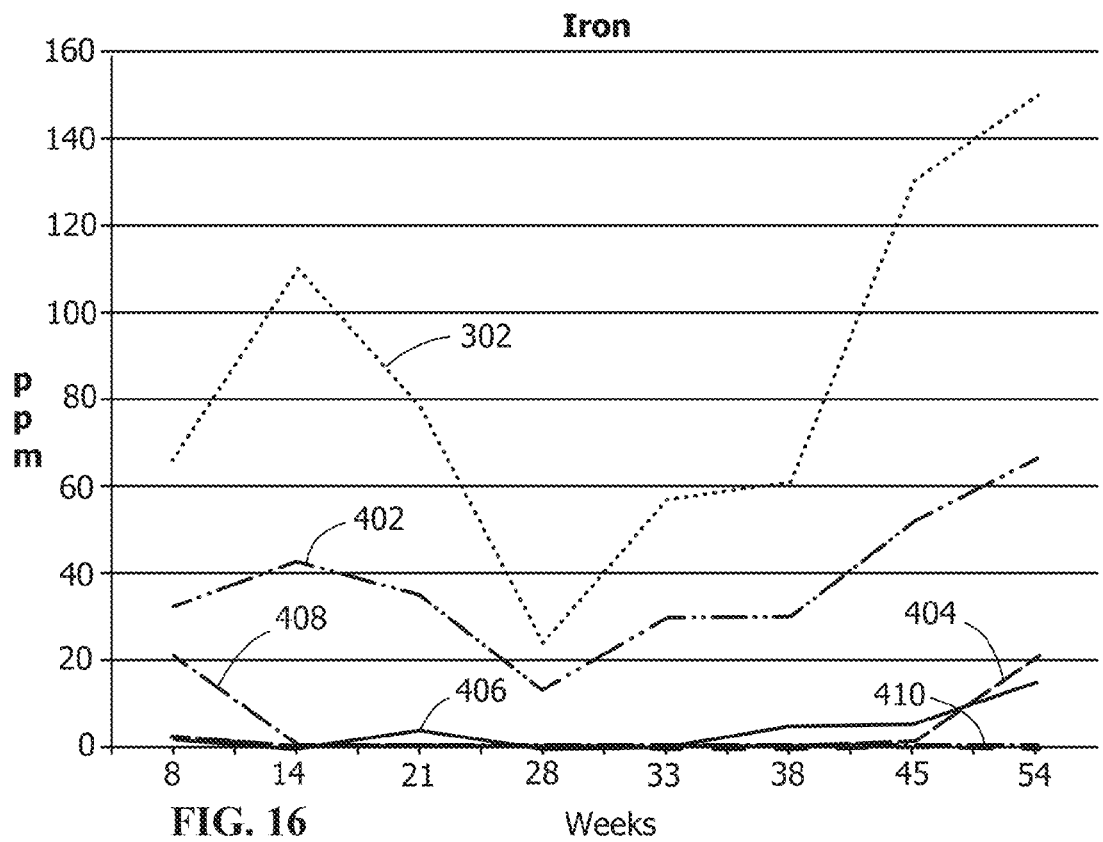
FIG. 16 is a graph illustrating Fe content of mediums including coal refuse, according to embodiments falling within the disclosure.

Suitable Fe content values include being devoid or substantially devoid of Fe. For example, in one embodiment, the Fe content begins at less than 1 ppm, for example, at about 0 ppm and remains less than 1 ppm, for example, at about 0 ppm over a period of 36 months (see FIGS. 7-8) and/or is less than 1 ppm, for example, at about 0 ppm at 8 weeks and remains at less than 1 ppm, for example, about 0 ppm over a 54-week period (see FIG. 16).

Figure 9:
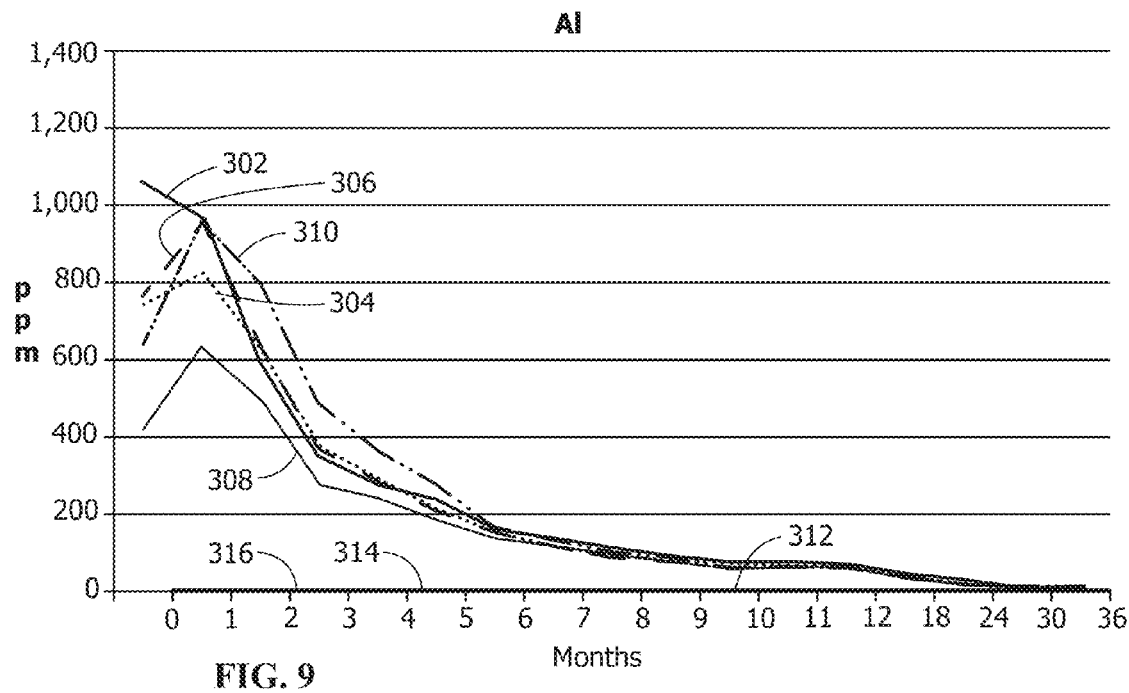
FIGS. 9-10 are graphs illustrating Al content of mediums including coal refuse, comparing a control, comparative examples, and embodiments falling within the disclosure.
Figure 10:
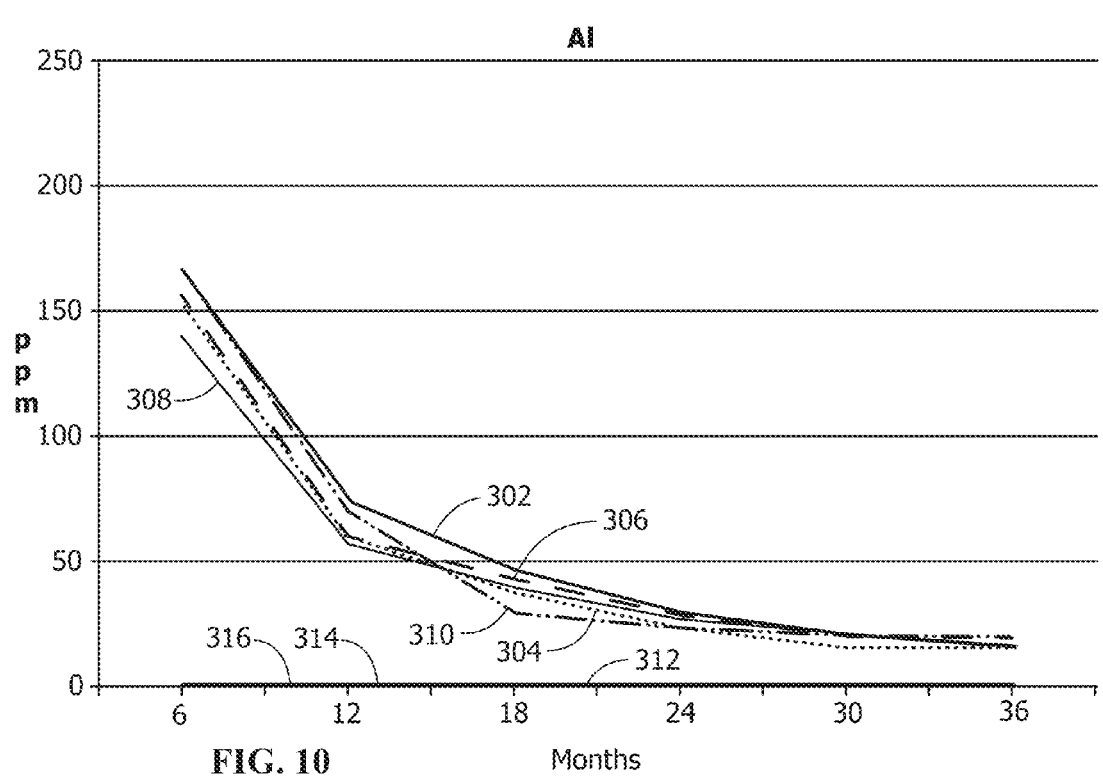
Figure 17:
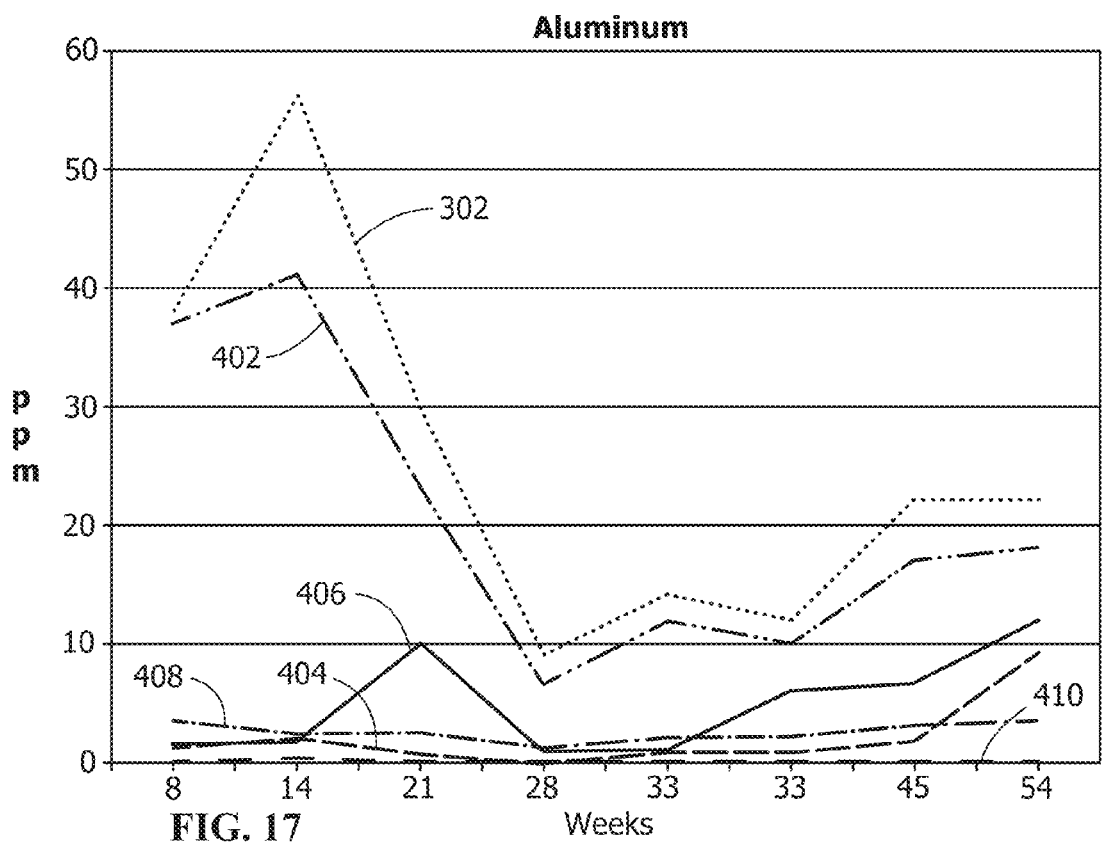
FIG. 17 is a graph illustrating Al content of mediums including coal refuse, according to embodiments falling within the disclosure.

Suitable Al content values include being devoid or substantially devoid of Al. For example, in one embodiment, the Al content begins at less than 1 ppm, for example, at about 0 ppm, and remains at less than 1 ppm, for example, at about 0 ppm over a period of 36 months (see FIGS. 9-10) and/or is at less than about 5 ppm and/or at about 0 ppm at 8 weeks and remains at less than about 5 ppm and/or at about 0 ppm over a 33-week period, remains at less than about 21 ppm over a 54-week period, and/or remains at less than about 5 ppm over a 54-week period (see FIG. 17).

Figure 11:
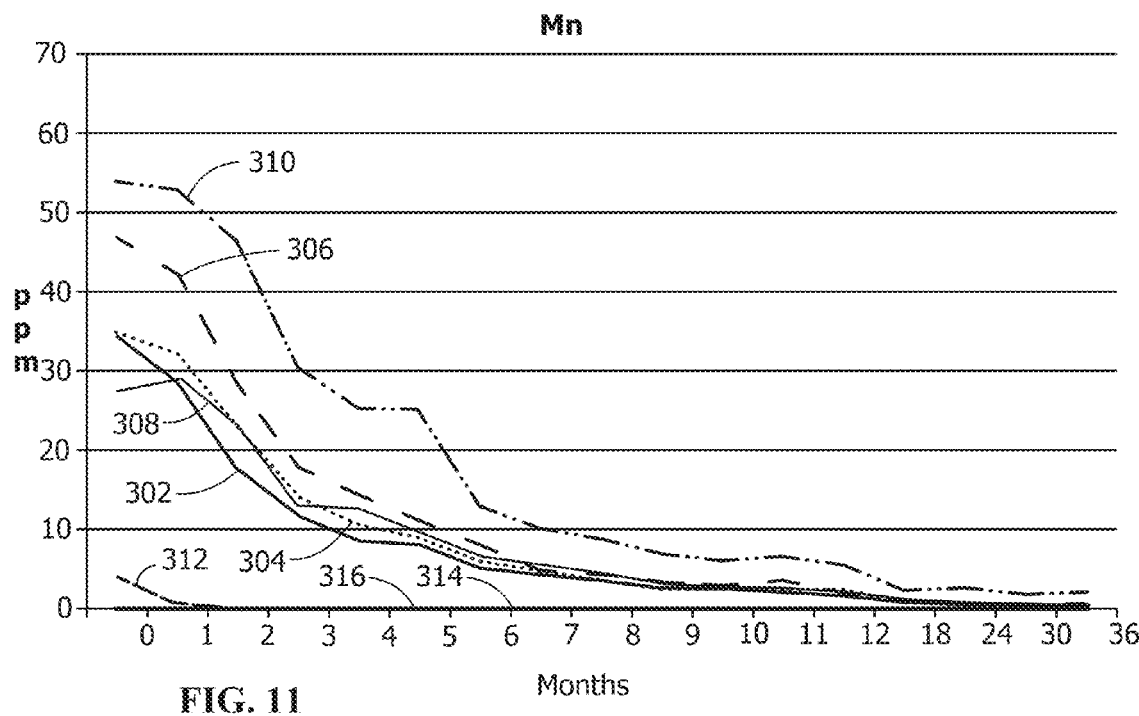
FIGS. 11-12 are graphs illustrating Mn content of mediums including coal refuse, comparing a control, comparative examples, and embodiments falling within the disclosure.
Figure 12:
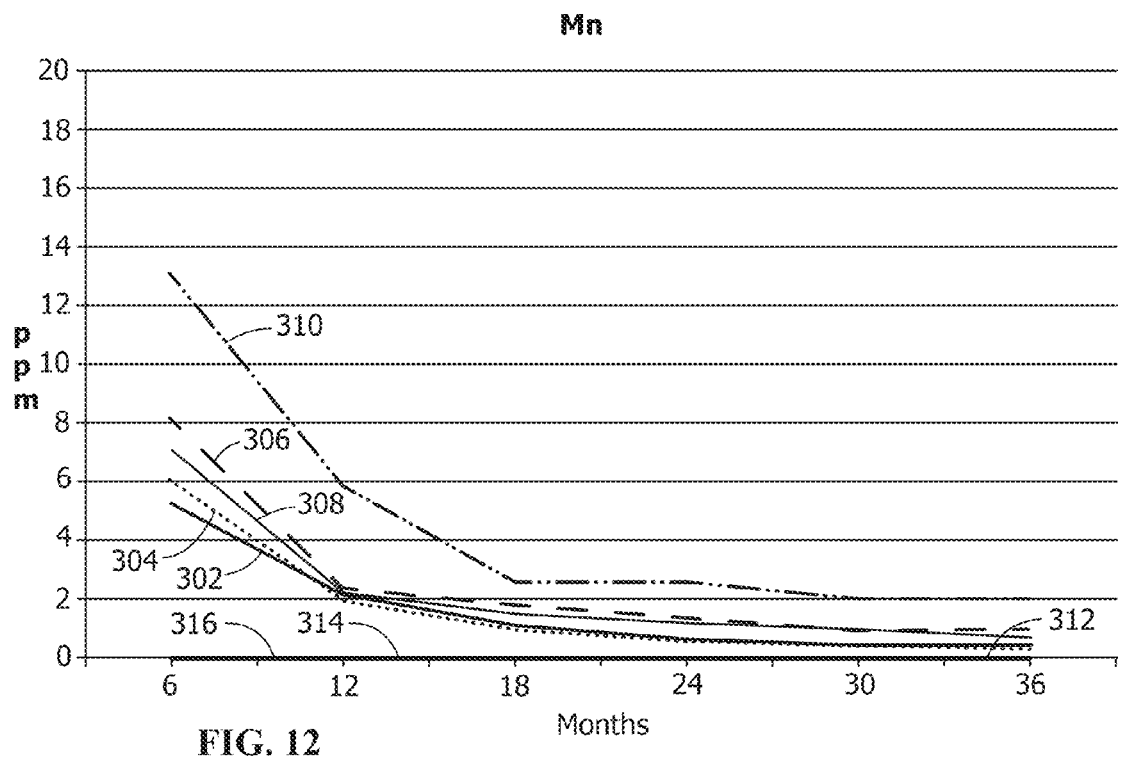
Figure 18:
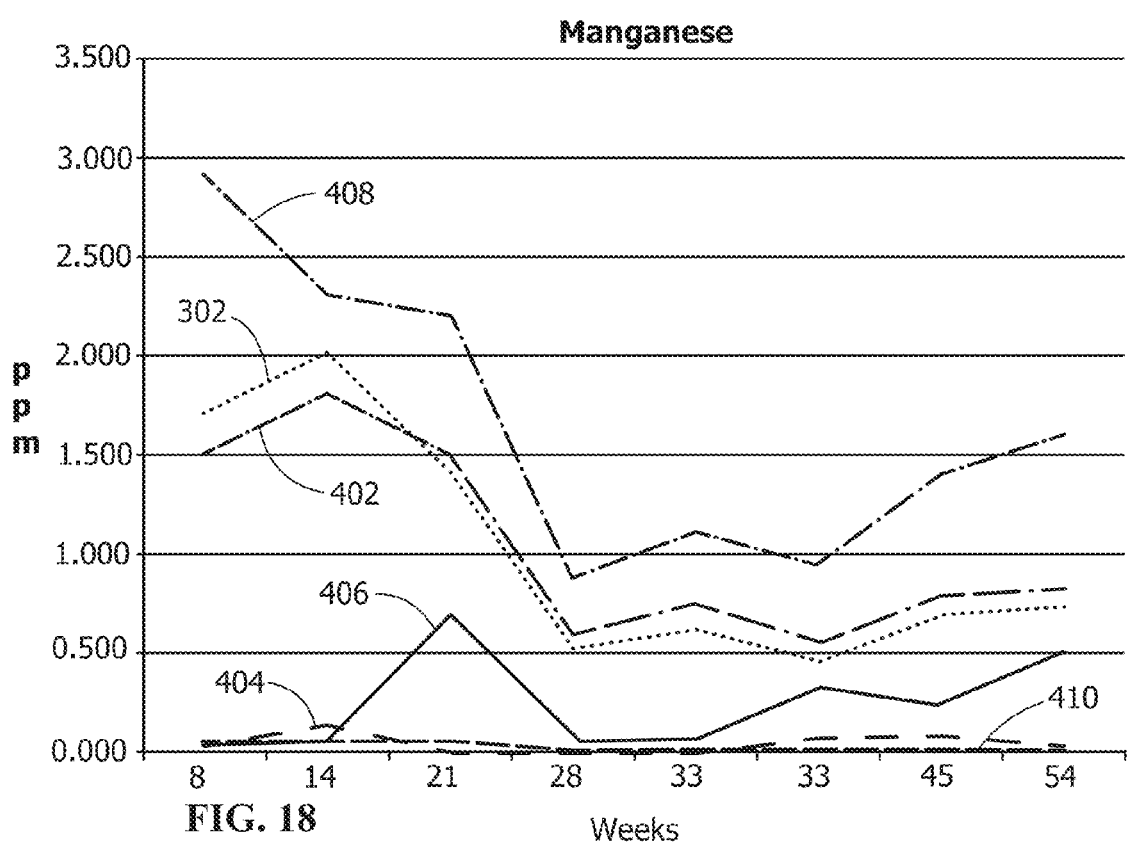
FIG. 18 is a graph illustrating Mn content of mediums including coal refuse, according to embodiments falling within the disclosure.

Suitable Mn content values include being devoid or substantially devoid of Mn. In one embodiment, the Mn content is between about 0 ppm and about 5 ppm, at about 0 ppm, at about 5 ppm, or any suitable combination, sub-combination, range, or sub-range therein. In one embodiment, the Mn content begins at between about 4 ppm and about 6 ppm, for example, at about 5 ppm and decreases to less than 1 ppm, for example, about 0 ppm over a period of 36 months (see FIGS. 11-12). In another embodiment, the Mn content begins at less than 1 ppm, for example, about 0 ppm and remains at less than 1 ppm, for example, about 0 ppm over a period of 36 months (see FIGS. 11-12). In another embodiment, the Mn content is less than 0.2 ppm, for example, at about 0.1 ppm at 8 weeks, slightly increases or spikes, and remains at less than about 0.7 ppm or less than about 0.2 ppm over a 54-week period (see FIG. 18).

Figure 13:
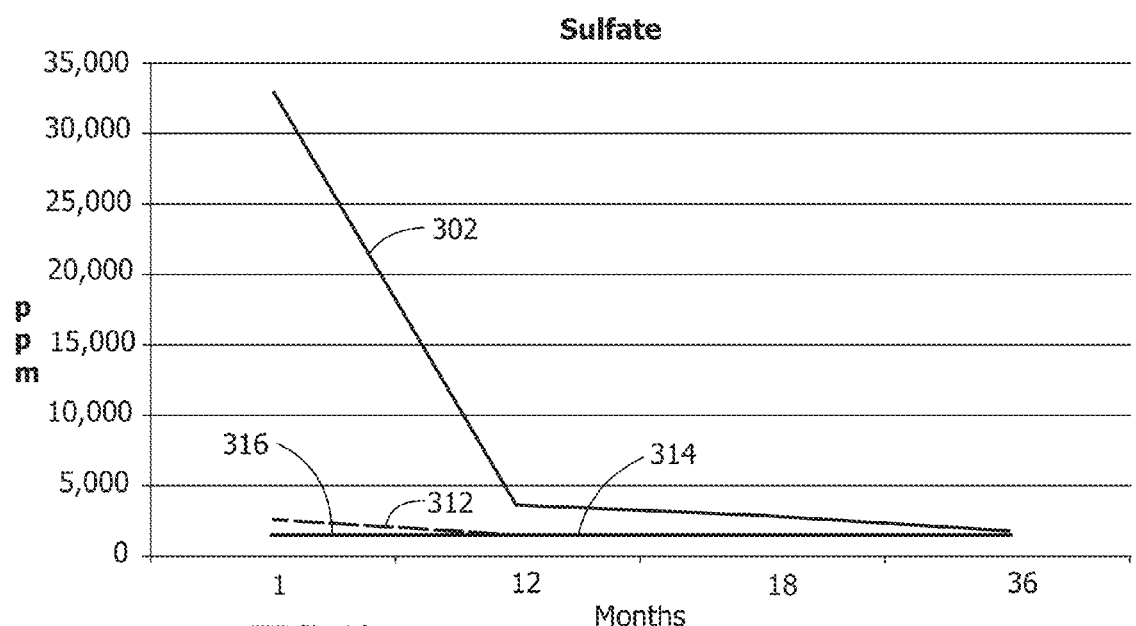
FIG. 13 is a graph illustrating sulfate content of mediums including coal refuse, comparing a control and embodiments falling within the disclosure.

Suitable sulfate content values include, but are not limited to, between about 2,000 ppm and about 2,500 ppm, about 2,000 ppm about 2,500 ppm, or any suitable combination, sub-combination, range, or sub-range therein. In one embodiment, the sulfate content begins between about 2,400 ppm and about 2,600 ppm, for example, at about 2,500 ppm and slightly decreases to between about 1,900 ppm and about 2,100 ppm, for example, about 2,000 ppm over a period of 36 months (see FIG. 13). In another embodiment, the sulfate content begins at between 1,900 ppm and 2,100 ppm, for example, about 2,000 ppm and remains between about 1,900 ppm and about 2,100 ppm, for example, at about 2,000 ppm over a period of 36 months (see FIG. 13).

Figure 14:
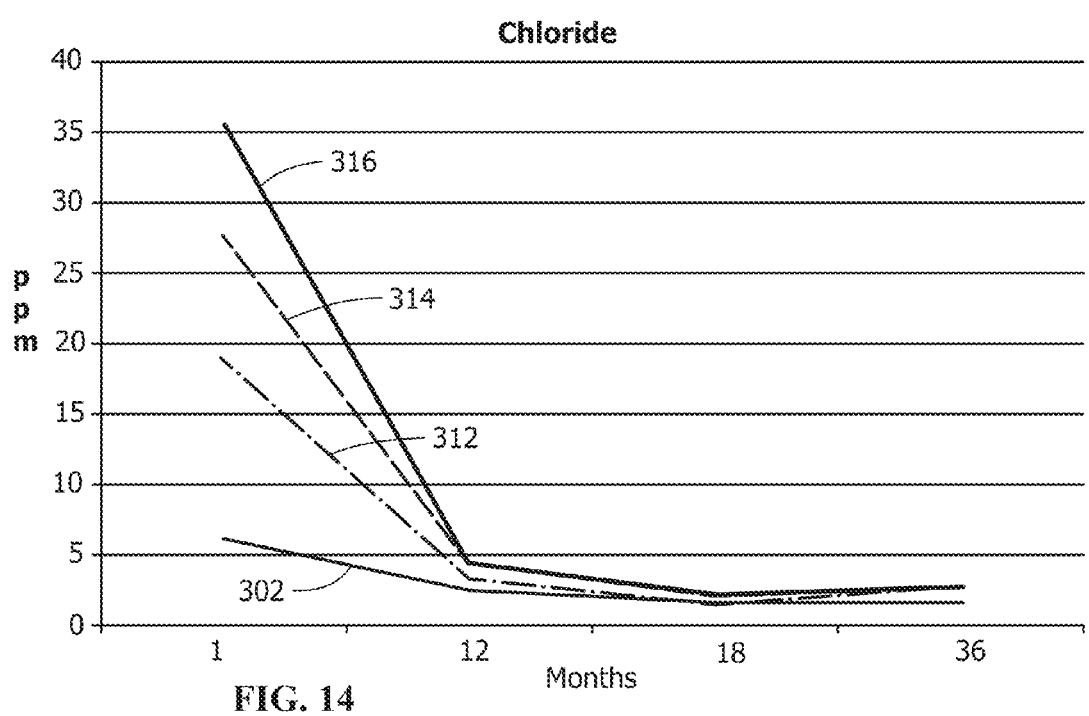
FIG. 14 is a graph illustrating chloride content of mediums including coal refuse, comparing a control and embodiments falling within the disclosure.

Suitable chloride content values include, but are not limited to, between about 2.5 ppm and about 27.5 ppm, between about 4 ppm and about 27.5 ppm, between about 2.5 ppm and about 19 ppm, between about 4 ppm and about 19 ppm, between about 2.5 ppm and about 4 ppm, or any suitable combination, sub-combination, range, or sub-range therein. In one embodiment, the chloride content begins between about 18 ppm and 20 ppm, for example, at about 19 ppm, and decreases to between about 2 ppm and about 3 ppm, for example, about 2.5 ppm over a period of 12 months, while remaining between about 2 ppm and 3 ppm, for example, generally at about 2.5 ppm, through 36 months (see FIG. 14). In another embodiment, the chloride content begins between about 25 ppm and about 30 ppm, for example, at about 27.5 ppm and decreases to less than 5 ppm, for example, about 4 ppm over a period of 12 months, while remaining between about 4 ppm and about 2.5 ppm through 36 months (see FIG. 14). In another embodiment, the chloride content begins between about 35 ppm and about 37 ppm, for example, at just over about 35 ppm, and decreases to less than about 5 ppm, for example, about 4 ppm over a period of 12 months, while remaining between about 4 ppm and about 2.5 ppm through 36 months (see FIG. 14).

EXAMPLES

In a first example, a comparative example, a medium having coal refuse is mixed with slag without limiting the coarseness/particle size of the coal refuse and without maintaining consistency of the blending. The coal refuse and the slag form a medium. The pH of the medium is not consistently reproducible, the ability of the medium to neutralize metals is not reproducible, and the results are generally undesirable.

In a second example through a fourteenth example, various versions of a medium are tested by positioning coal refuse with a coarseness/particle size corresponding with about 40% of the particles in the coal refuse 104 being capable of passing through a standard number 4 sieve. The medium is positioned within a vertically-oriented polyvinyl chloride pipe of about 48 inches in height with about a 4-inch diameter. A fiber cloth is positioned at the bottom of the pipe. Three samples of each example are tested over a period of weeks and/or months for pH, electrical conductivity, TDS, redox potential, Fe content, Al content, Mn content, sulfate content, and chloride content.

In the second example, a control 302 (see FIGS. 3 through 18), a medium having coal refuse without slag is tested. The pH begins at just below about 2 and slightly increases to just above about 2 over a period of 36 months (see FIG. 3) and/or begins at just above about 2 and stays at about 2 for a 54-week period (see FIG. 15). The electrical conductivity begins at about 20,000 microsiemens per centimeter and decreases to about 5,000 microsiemens per centimeter over a period of 36 months (see FIG. 4). The TDS begins at about 12,000 parts per million (ppm) and decreases to about 3,000 ppm over a period of 36 months (see FIG. 5). The redox potential begins at below about 600 mv and slightly increases to about 620 mv over a period of 36 months (see FIG. 6). The Fe content begins at just above about 8,000 ppm and decreases to about 50 ppm over a period of 36 months (see FIGS. 7-8) and/or is at about 65 ppm after 8 weeks, spikes to about 110 ppm, drops to about 25 ppm, and increases to about 150 ppm over a 54-week period (see FIG. 16). The Al content begins at about 1,000 ppm and decreases to about 25 ppm over a period of 36 months (see FIGS. 9-10) and/or is at about 37 ppm after 8 weeks, spikes to about 55 ppm, then decreases to about 9 ppm, before increasing to about 22 ppm over a 54-week period (see FIG. 17). The Mn content begins at about 35 ppm and decreases to about 0.5 ppm over a period of 36 months (see FIGS. 11-12) and/or is at about 1.7 ppm after 8 weeks, increases to 2.0 ppm, decreases to about 0.5 ppm, and remains between about 0.5 ppm and about 0.8 ppm over a 54-week period (see FIG. 18). The sulfate content begins at about 33,000 ppm and decreases to about 2,500 over a period of 36 months (see FIG. 13). The chloride content begins at about 6 ppm and decreases to about 2 ppm over a period of 36 months (see FIG. 14).

In a third example, a first comparative example 304 (see FIGS. 3 through 12), a medium having, by weight, about 1% slag is blended with coal refuse and positioned above substantially pure coal refuse in the PVC pipe. The pH begins at just below about 2 and slightly increases to about 2.5 over a period of 36 months (see FIG. 3). The electrical conductivity begins at about 19,100 microsiemens per centimeter, spikes, then decreases to less than about 5,000 microsiemens per centimeter over a period of 36 months (see FIG. 4). The TDS begins at about 9,200 ppm, spikes, then decreases to about 2,900 ppm over a period of 36 months (see FIG. 5). The redox potential begins at about 580 mv and slightly increases to about 625 mv over a period of 36 months (see FIG. 6). The Fe content begins at just below about 8,000 ppm and decreases to about 50 ppm over a period of 36 months (see FIGS. 7-8). The Al content begins at about 750 ppm, spikes, then decreases to about 25 ppm over a period of 36 months (see FIGS. 9-10). The Mn content begins at about 35 ppm and decreases to about 0.5 ppm over a period of 36 months (see FIGS. 11-12).

In a fourth example, a second comparative example 306 (see FIGS. 3 through 12), a medium having, by weight, about 1% slag is blended with coal refuse and positioned below substantially pure coal refuse in the PVC pipe. The pH begins at just above about 2 and slightly increases to about 2.5 over a period of 36 months (see FIG. 3). The electrical conductivity begins at about 13,000 microsiemens per centimeter, spikes, then decreases to about 4,000 microsiemens per centimeter over a period of 36 months (see FIG. 4). The TDS begins at about 8,000 ppm, spikes, then decreases to about 2,100 ppm over a period of 36 months (see FIG. 5). The redox potential begins at about 505 mv and slightly increases to about 580 mv over a period of 36 months (see FIG. 6). The Fe content begins at about 5,600 ppm, spikes, then decreases to about 50 ppm over a period of 36 months (see FIGS. 7-8). The Al content begins at about 780 ppm, spikes, then decreases to about 25 ppm over a period of 36 months (see FIGS. 9-10). The Mn content begins at about 47 ppm and decreases to about 1 ppm over a period of 36 months (see FIGS. 11-12).

In a fifth example, a third comparative example 308 (see FIGS. 3 through 12), a medium having, by weight, about 1% slag is blended with coal refuse and positioned above and below substantially pure coal refuse in the PVC pipe. The pH begins at just above about 2 and slightly increases to about 2.5 over a period of 36 months (see FIG. 3). The electrical conductivity begins at about 6,000 microsiemens per centimeter, spikes, then decreases to about 4,000 microsiemens per centimeter over a period of 36 months (see FIG. 4). The TDS begins at about 4,000 ppm, spikes, then decreases to about 2,100 ppm over a period of 36 months (see FIG. 5). The redox potential begins at about 505 mv and slightly increases to about 540 mv over a period of 36 months (see FIG. 6). The Fe content begins at about 2,000 ppm, spikes, then decreases to about 50 ppm over a period of 36 months (see FIGS. 7-8). The Al content begins at about 410 ppm, spikes, then decreases to about 25 ppm over a period of 36 months (see FIGS. 9-10). The Mn content begins at about 28 ppm, slightly spikes, then decreases to about 0.8 ppm over a period of 36 months (see FIGS. 11-12).

In a sixth example, a fourth comparative example 310 (see FIGS. 3 through 12), a medium having, by weight, about 2% slag is blended with coal refuse and positioned above and below substantially pure coal refuse in the PVC pipe. The pH begins at just above about 2 and slightly increases to about 3 over a period of 36 months (see FIG. 3). The electrical conductivity begins at about 4,500 microsiemens per centimeter, spikes, then decreases to about 3,000 microsiemens per centimeter over a period of 36 months (see FIG. 4). The TDS begins at about 2,500 ppm, spikes, then decreases to about 1,800 ppm over a period of 36 months (see FIG. 5). The redox potential begins at about 510 mv and decreases to about 400 mv over a period of 36 months (see FIG. 6). The Fe content begins at about 3,000 ppm, spikes, then decreases to about 270 ppm over a period of 36 months (see FIGS. 7-8). The Al content begins at about 790 ppm, spikes, then decreases to about 25 ppm over a period of 36 months (see FIGS. 9-10). The Mn content begins at about 55 ppm and decreases to about 2 ppm over a period of 36 months (see FIGS. 11-12).

In a seventh example, a first embodiment 312 (see FIGS. 3 through 14), a medium having, by weight, about 4% slag is blended with coal refuse and positioned throughout the PVC pipe. The pH begins at about 6.8 and slightly increases to about 8.5 over a period of 36 months (see FIG. 3). The electrical conductivity begins at about 3,000 microsiemens per centimeter and slightly decreases to about 2,500 microsiemens per centimeter over a period of 36 months (see FIG. 4). The TDS begins at just below about 2,000 ppm and slightly decreases to about 1,200 ppm over a period of 36 months (see FIG. 5). The redox potential begins at about 230 mv and varies between about 200 mv and about 400 mv over a period of 36 months (see FIG. 6). The Fe content begins at about 0 ppm, spikes and remains at about 0 ppm over a period of 36 months (see FIGS. 7-8). The Al content begins at about 0 ppm, spikes and remains at about 0 ppm over a period of 36 months (see FIGS. 9-10). The Mn content begins at about 5 ppm and remains at about 5 ppm over a period of 36 months (see FIGS. 11-12). The sulfate content begins at about 2,500 ppm and slightly decreases to about 2,000 ppm over a period of 36 months (see FIG. 13). The chloride content begins at about 19 ppm and decreases to about 2.5 ppm over a period of 12 months, while remaining generally at about 2.5 ppm through 36 months (see FIG. 14).

In an eighth example, a second embodiment 314 (see FIGS. 3 through 14), a medium having, by weight, about 8% slag is blended with coal refuse and positioned throughout the PVC pipe. The pH begins at about 7.9 and slightly increases to about 9.2 over a period of 36 months (see FIG. 3). The electrical conductivity begins at about 2,500 microsiemens per centimeter and stays at about 2,500 microsiemens per centimeter over a period of 36 months (see FIG. 4). The TDS begins at just below about 1,600 ppm and slightly decreases to about 1,200 ppm over a period of 36 months (see FIG. 5). The redox potential begins at about 190 mv and generally increases to about 280 mv over a period of 36 months (see FIG. 6). The Fe content begins at about 0 ppm, spikes and remains at about 0 ppm over a period of 36 months (see FIGS. 7-8). The Al content begins at about 0 ppm, spikes and remains at about 0 ppm over a period of 36 months (see FIGS. 9-10). The Mn content begins at about 0 ppm and remains at about 0 ppm over a period of 36 months (see FIGS. 11-12). The sulfate content begins at about 2,000 ppm and remains at about 2,000 ppm over a period of 36 months (see FIG. 13). The chloride content begins at about 27.5 ppm and decreases to about 4 ppm over a period of 12 months, while remaining between about 4 ppm and about 2.5 ppm through 36 months (see FIG. 14).

In a ninth example, a third embodiment 316 (see FIGS. 3 through 14), a medium having, by weight, about 12% slag is blended with coal refuse and positioned throughout the PVC pipe. The pH begins at about 8.6 and slightly increases to about 9.5 over a period of 36 months (see FIG. 3). The electrical conductivity begins at about 2,500 microsiemens per centimeter and stays at about 2,500 microsiemens per centimeter over a period of 36 months (see FIG. 4). The TDS begins at just below about 1,600 ppm and slightly decreases to about 1,200 ppm over a period of 36 months (see FIG. 5). The redox potential begins at about 180 mv and generally increases to about 240 mv over a period of 36 months (see FIG. 6). The Fe content begins at about 0 ppm, spikes and remains at about 0 ppm over a period of 36 months (see FIGS. 7-8). The Al content begins at about 0 ppm, spikes and remains at about 0 ppm over a period of 36 months (see FIGS. 9-10). The Mn content begins at about 0 ppm and remains at about 0 ppm over a period of 36 months (see FIGS. 11-12). The sulfate content begins at about 2,000 ppm and remains at about 2,000 ppm over a period of 36 months (see FIG. 13). The chloride content begins at just over about 35 ppm and decreases to about 4 ppm over a period of 12 months, while remaining between about 4 ppm and about 2.5 ppm through 36 months (see FIG. 14).

In a tenth example, a comparative example 402 (see FIGS. 15 through 18), a medium having, by weight, about 6.4% slag is blended with coal refuse and positioned above 39 inches of substantially pure coal refuse in about 2.5 inches of the PVC pipe. The pH begins at just about 2.5 and stays at 2.5 over a 54-week period (see FIG. 15). The Fe content is at about 30 ppm at 8 weeks and trends toward about 65 ppm over a 54-week period (see FIG. 16). The Al content is at about 37 ppm at 8 weeks, slightly increases, then decreases to about 7 ppm, before increasing to about 18 ppm over a 54-week period (see FIG. 17). The Mn content is at about 1.5 ppm at 8 weeks, slightly increases, decreases to about 0.5 ppm, then stays between about 0.5 ppm and about 0.8 ppm over a 54-week period (see FIG. 18).

In an eleventh example, a fourth embodiment 404 (see FIGS. 15 through 18), a medium having, by weight, about 7.9% slag is blended with coal refuse and positioned above and below 38 inches of substantially pure coal refuse in about 3 inches of the PVC pipe. The pH is at about 10 at 3 weeks, slightly increases, then decreases to just below about 9 over a 54-week period (see FIG. 15). The Fe content is at about 0 ppm at 8 weeks and increases to about 20 ppm toward the end of a 54-week period (see FIG. 16). The Al content is at about 2 ppm at 8 weeks and increases to about 9 ppm toward the end of a 54-week period (see FIG. 17). The Mn content is at about 0.1 ppm at 8 weeks, slightly increases, but generally remains below 0.2 ppm over a 54-week period (see FIG. 18).

In a twelfth example, a fifth embodiment 406 (see FIGS. 15 through 18), a medium having, by weight, about 6.6% slag is blended with coal refuse and positioned in 2.5 inches above and 3 inches below 38 inches of substantially pure coal refuse in the PVC pipe. The pH is at about 12.7 at 3 weeks, decreases to about 8, and ends at about 9 over a 54-week period (see FIG. 15). The Fe content is at about 0 ppm at 8 weeks and increases to about 18 ppm toward the end of a 54-week period (see FIG. 16). The Al content is at about 2 ppm at 8 weeks and ultimately increases to about 12 ppm toward the end of a 54-week period (see FIG. 17). The Mn content is at about 0.1 ppm at 8 weeks, increases to about 0.7 ppm, decreases back to about 0.1 ppm, and then increases to about 0.5 ppm over a 54-week period (see FIG. 18).

In a thirteenth example, a comparative example 408 (see FIGS. 15 through 18), a medium having, by weight, about 5% slag blended with coal refuse through 36 inches of the PVC pipe. The pH is at about 2.5 at 3 weeks and increases to about 4 over a 54-week period (see FIG. 15). The Fe content is at about 20 ppm at 8 weeks and decreases to about 0 ppm, and remains at about 0 ppm over a 54-week period (see FIG. 16). The Al content is at about 3 ppm at 8 weeks and generally remains at about 8 ppm through a 54-week period (see FIG. 17). The Mn content is at about 2.8 ppm at 8 weeks, decreases to just below about 1.0 ppm, before increasing to about 1.5 ppm over a 54-week period (see FIG. 18).

In a fourteenth example, a sixth embodiment 410 (see FIGS. 15 through 18), a medium having, by weight, about 10% slag blended with coal refuse through 36 inches of the PVC pipe. The pH is at about 5 at 3 weeks and increases to about 8.5 over a 54-week period (see FIG. 15). The Fe content is at about 0 ppm at 8 weeks and remains at about 0 ppm over a 54-week period (see FIG. 16). The Al content is at about 0 ppm at 8 weeks and remains at about 0 ppm over a 54-week period (see FIG. 17). The Mn content is at about 0 ppm at 8 weeks and remains at about 0 ppm over a 54-week period (see FIG. 18).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coal refuse remediation process, comprising:
providing coal refuse; and
blending a slag with at least a portion of the coal refuse to form a medium;
wherein the coal refuse has a particle size and the coal refuse has a composition, by weight, of between about 10% to about 15% refuse;
wherein the medium has a pH within a range of about 3.5 and about 10 and the medium facilitates growth of vegetation when applied to a coal refuse pile at a thickness of less than about 24 inches.

2. The coal refuse remediation process of claim 1, wherein the medium is substantially devoid of Fe content, Al content, and Mn content.

3. The coal refuse remediation process of claim 1, further comprising growing the vegetation in the medium.

4. The coal refuse remediation process of claim 1, further comprising compacting the medium to at least about 95% compaction.

5. The coal refuse remediation process of claim 1, further comprising erecting a structure on the medium.

6. The coal refuse remediation process of claim 1, wherein the coal refuse has a pH of less than about 3.5.

7. The coal refuse remediation process of claim 1, wherein the coal refuse is a portion of the coal refuse pile and the slag is not a portion of the coal refuse pile.

8. The coal refuse remediation process of claim 1, wherein the coal refuse and the slag are a portion of the coal refuse pile.

9. The coal refuse remediation process of claim 1, wherein the coal refuse has a composition, by weight, of between about 85% to about 90% coal.

10. The coal refuse remediation process of claim 1, wherein the particle size of the coal refuse corresponds with all material in the coal refuse having a maximum dimension of less than about 2 inches.

11. The coal refuse remediation process of claim 1, wherein the particle size of the coal refuse corresponds with at least about 25% of the material in the coal refuse being capable of passing through a standard number 4 sieve.

12. The coal refuse remediation process of claim 1, wherein all material in the slag includes a maximum dimension of no more than about 0.5 inches.

13. The coal refuse remediation process of claim 1, wherein the blending includes blending soil with the slag.

14. The coal refuse remediation process of claim 1, wherein the blending includes blending organic matter with the slag.

15. The coal refuse remediation process of claim 1, wherein the blending includes blending seeds with the slag.

16. The coal refuse remediation process of claim 1, wherein the blending includes blending a starter fertilizer with the slag.

17. The coal refuse remediation process of claim 1, wherein the slag is from production of a product selected from the group consisting of stainless steel, carbon steel, aluminum, phosphate, copper, zinc, non-ferrous material, alloy steel, iron, coal-powered energy, and combinations thereof.

18. A coal refuse remediation process, comprising:
providing coal refuse having a particle size, having a pH of less than about 3.5, and having a composition of, by weight, between about 4% and about 8% $Fe_2O_3$, between about 14% and about 18%, $Al_2O_3$, at least about 0.01% MnO, between about 2% and about 5% S, and between about 25% and about 35% C; and
blending a slag with at least a portion of the coal refuse to form a medium, the slag being from production of a product selected from the group consisting of stainless steel, carbon steel, aluminum, phosphate, copper, zinc, non-ferrous material, alloy steel, iron, coal-powered energy, and combinations thereof;
wherein the medium has a pH within a range of about 3.5 and about 10 and the medium facilitates growth of vegetation when applied to a coal refuse pile at a thickness of less than about 24 inches.

19. A coal refuse remediation process, comprising:
providing coal refuse having a particle size, having a pH of less than about 3.5, and having a composition of, by weight, between about 4% and about 8% $Fe_2O_3$, between about 14% and about 18%, $Al_2O_3$, at least about 0.01% MnO, between about 2% and about 5% S, and between about 25% and about 35% C; and
blending a slag from production of one or both of stainless steel and iron to form a medium;
wherein the medium has a pH within a range of about 3.5 and about 10 and the medium facilitates growth of vegetation when applied to a coal refuse pile at a thickness of less than about 24 inches.

* * * * *